United States Patent Office 2,849,293
Patented Aug. 26, 1958

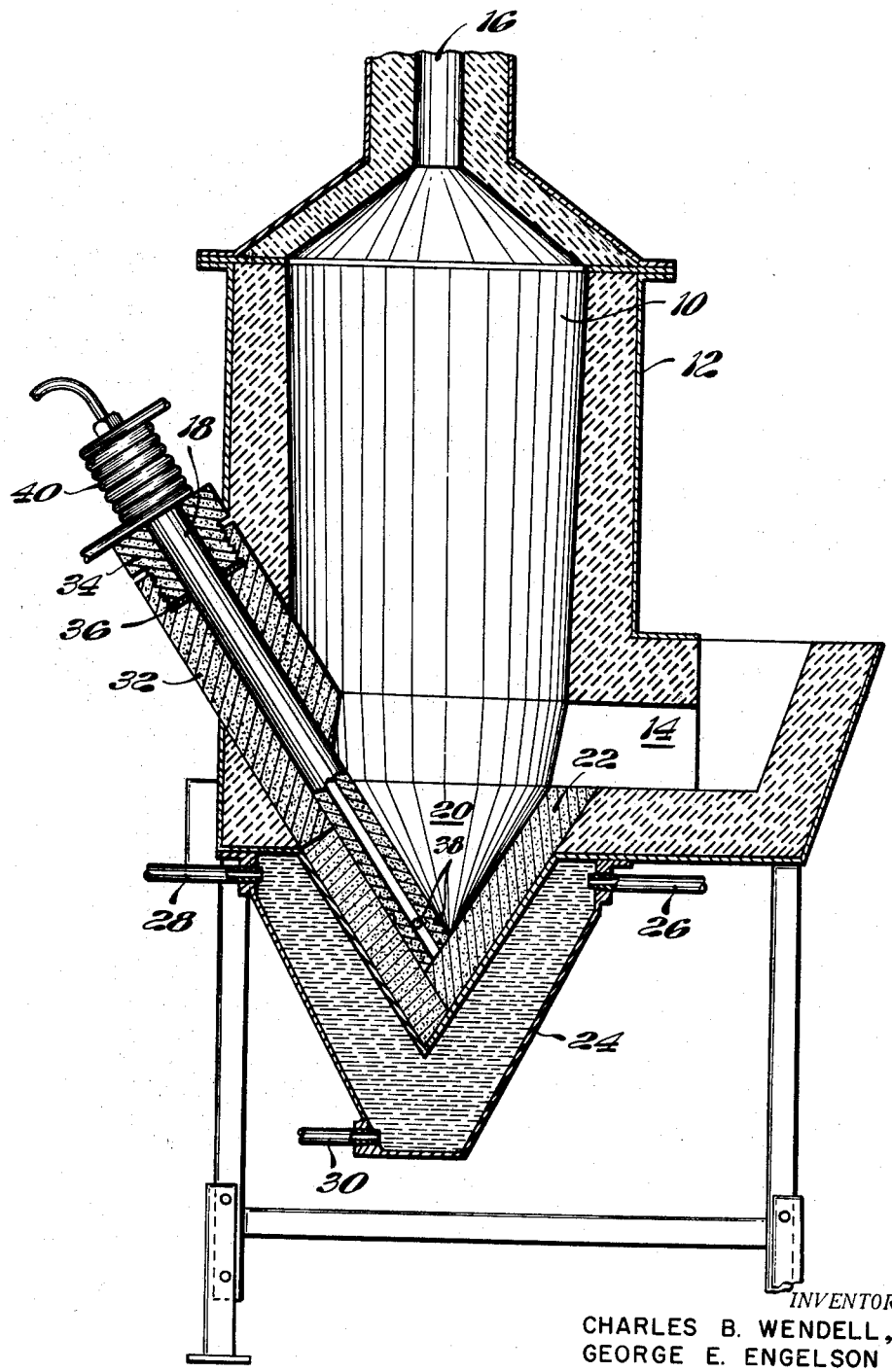
INVENTORS
CHARLES B. WENDELL, JR.
GEORGE E. ENGELSON
HENRY P. DONOHUE, JR.

2,849,293

METAL HALIDE GENERATOR

Charles B. Wendell, Jr., Canton, George E. Engelson, Kenberma, and Henry P. Donohue, Jr., Quincy, Mass., assignors to Godfrey L. Cabot, Inc., Boston, Mass., a corporation of Massachusetts Application November 26, 1954, Serial No. 471,392

8 Claims. (Cl. 23—281)

This invention relates to the production of metal halides and in particular to an improved apparatus for generating metal halides by the reaction of gaseous halogen with molten metal. Some of the more important compounds which can be produced in the apparatus of this invention are chlorides and bromides of aluminum, antimony, bismuth, tin and zinc.

Although the reaction of halogen gas with molten metals is today one of the favored methods of producing metal halides, the apparatus currently available for this purpose leaves much to be desired. Such apparatus consists of a more or less flat bottomed, refractory-lined container having a halogen gas feed conduit connected into the bottom. A water jacket is provided below the container bottom but serves only to cool the halogen gas feed tube. Because of the disastrous consequences attendant upon permitting water to enter the reaction zone the gas conduit must be securely connected into the container. Only metal piping and fittings can be used for this purpose and they are very short lived. Under the highly corrosive condition of service four weeks is about their maximum life expectancy. Furthermore, such apparatus is not capable of high production rates because of localized overheating and product discoloration. For example, when producing aluminum chloride a production rate of 80 lbs. per hours is about the practicable maximum. Above that rate deterioration of apparatus is drastically accelerated and the product is unsatisfactory. The apparatus of our invention, on the other hand, is capable of production rates at least half again that of conventional apparatus of equivalent size and is much more durable.

A further and serious disadvantage of presently known metal halide generators is that they can not be operated intermittently. If operation is interrupted, even momentarily, the metal freezes in the halogen gas feed system, and of course in the container as well, which means that a new feed system must be installed and the frozen metal must be melted before restarting. The apparatus of our invention is not subject to this disability.

It is the principal object of this invention to provide a novel apparatus in which to produce metal halides by reaction between a metal and a halogen gas, having greater flexibility and durability and larger production capacity for equivalent size than similar apparatus hitherto known.

It is also an object of this invention to provide a novel metal halide reactor having in combination means for effectively cooling the reactor in the critical zone thereof and for safely delivering halogen gas thereto.

Another object is to provide a novel reactor wall construction which is resistant to attack by reactant metal and halogen gas but which has low resistance to heat transfer.

It is also an object of this invention to provide apparatus in which a strongly exothermic reaction between a molten metal and a halogen gas can be closely, safely and conveniently controlled.

These and other objects and advantages of this invention are accomplished by providing a reactor having a metal shell and consisting of a bottom section encased on the outside by a cooling jacket and internally lined with a material resistant to attack by molten metal and halogen gas and bonded in good thermal contact to the metal shell, an insulated unjacketed upper section, a removable halogen gas conduit extending from outside the reactor through the wall of the unjacketed upper section and well down into the jacketed bottom section, and means to supply reactant metal and gas to the reactor and to recover product vapors therefrom.

Our invention will better be understood and appreciated from the following description of one embodiment thereof illustrated in the accompanying diagrammatic drawing, which is a view in vertical cross section of that embodiment.

The apparatus comprises a reactor 10 encased in a metal shell 12 having a metal charging port 14 in one side, a product recovery flue 16 at the top and one or more side-entering halogen gas conduits 18 (one shown) as hereinafter described.

The lower portion of the metal shell, below the metal charging port 14 and the point of entry of the halogen gas conduit 18, is surrounded by a jacket 24 of generally conforming shape. Said jacket is provided with an inlet 30 and outlets 26 and 28 by means of which a cooling liquid can be circulated through the space between the metal shell and the jacket 24. The unjacketed portion of said metal shell is lined on the interior with a layer of insulating refractory to protect the section of this shell above the molten metal from attack by heat and corrosive vapors. Alundum or similar basic metal oxide refractory is the preferred material for this lining. The jacketed portion of said metal shell is lined on the inside with a layer of material 22 having good resistance to both molten metals and halogen gases. This material should be cemented in good thermal contact to the inside of the metal shell in order to provide a wall construction through which the overall resistance to heat transfer is as low as possible. Graphite is the preferred material for this lining because of its high thermal conductivity. A thin layer of acid proof cement of relatively high thermal conductivity is useful for securing this lining to the metal shell. An inner lining (not shown) of similar material, also preferably graphite, can be used to protect the insulating refractory lining in that part of the unjacketed portion of the reactor which is below the surface normal level of the pool of molten metal, i. e., the part of the reactor in which the metal charging port 14 and the halogen gas delivery conduit(s) 18 are located. The halogen gas conduit(s) may enter as shown or through other side walls or by way of the metal charging port itself.

The halogen gas conduit or tube 18 is adjustably and removably mounted as, for example in sleeve 32. Graphite is also the preferred material for these parts which in service are also exposed to molten metals and halogen gases. In fact, the densest and most impervious graphite is preferred for these parts of the halogen gas delivery assembly. For example, graphite which has been especially treated or impregnated for this service is ideal. However, any other material resistant to both molten metals and halogen gases at temperatures up to about 1400–1500° F. can be used for these parts. Also, certain refractory coated and lined metal tubes are reasonably durable under such conditions. The mounting sleeve 32 and the several sections of lining in the reactor should all be cemented together with an acid proof cement. A bushing 34, preferably of the same material as halogen gas conduit 18 and sleeve 32, e. g., graphite, and a high temperature seal ring 36, e. g., an asbestos gasket, are provided to hold conduit 18 in place and to maintain a leak proof seal.

The mounting of the halogen gas conduit or delivery tube 18 in the side wall of the reactor immediately above the jacketed section of the reactor shell in such manner that the said tube extends well down into the jacketed section of the reactor is an important feature of this invention. The discharge ports 38 in said tube are preferably located near the lowest point in the reactor and, therefore, well removed from port 14 in order to help prevent vapor leakage past the liquid seal at this point. The initial reaction and, in fact, the bulk of the overall reaction between halogen gas and metal is thus effected in the jacketed section of the reactor, which is therefore sometimes designated hereinafter as the primary reaction zone 20. Because of the highly exothermic nature of the metal halide forming reaction, this primary reaction zone should be designed for maximum heat transfer. Thus, a generally conical or pyramidal shape is preferred for this zone since such shapes provide the maximum surface to volume ratio. A pyramidal jacketed section 20 is shown in the drawing. However, the shape of this primary reaction zone is not critical, and it could be formed in any other convenient shape, such as hemispherical, cylindrical, prismatic or prismoidal. This lower jacketed reaction zone can even be merely an extension of the upper reactor shell, having the same horizontal cross sectional shape, e. g., circular or rectangular. However, a sloping floor has the advantage that it can be utilized to support the end of tube 18 which extends down into the primary reaction zone.

If graphite is used for the halogen gas tube 18, sleeve 32, and/or bushing 34, the external portions of these parts should be protected against oxidation. This may be accomplished either by cooling or by excluding oxygen. For example, they may be cooled by water sprays or by closely fitting cooling coils 40 wound around the end of tube 18 or they may be protected by a blanket of inert gas such as nitrogen.

In operation, molten metal is charged to the reactor through charging port 14. It will be noted that when the surface level of the metal is above the top of the port a fluid seal is provided to prevent the escape of vapors through the port and this level is maintained as the reaction proceeds by the addition of metal. Halogen gas is at the same time delivered to tube 18 and bubbles up from discharge ports 38 through the body of molten metal. The reaction between gas and metal is highly exothermic and proceeds rapidly so that normally the halogen gas is completely combined with the metal as the corresponding metal halide by the time it breaks the surface of the molten metal. The metal halide product is a vapor while in the reactor and unless it is to be conducted to another reaction zone for oxidation as, for example, described in copending U. S. patent application, Ser. No. 366,008, of Beattie et al. filed July 3, 1953, is conducted to condensers in conventional fashion. During operation of the reactor water or other suitable cooling liquid is continuously circulated through cooling jacket 24, and by reason of the excellent heat transfer provided temperatures within the apparatus can be effectively controlled by this means.

The convenience of the halogen gas delivery assembly of the reactor of this invention is particularly outstanding. Thus, by loosening the bushing 34 the exact position of the graphite tube 18 can be adjusted to any desired level. Moreover, by providing more than one halogen gas delivery assembly on each generator, a tube can be completely removed and replaced without interrupting the operation of the generator.

The dimensions of the reactor are not particularly critical. However, it is usually desirable to operate with a pool of molten metal at least about six inches deep. In most cases it will be desirable to have the liquid metal level about 12 to 18 inches above the discharge end of the halogen gas delivery tube. Of course, the depth of the molten metal may be as much as several feet. In general, it will be desirable to have the level of the molten metal just sufficiently above the discharge end of the halogen gas delivery tube 18 that the halogen gas will react completely with the molten metal during its ascent therethrough. The exact design of this reaction section of the generator will obviously depend upon the nature of the reaction to be carried out, the rate at which the halogen gas is to be fed and the number and design of the discharge orifices through which the halogen is admitted into the pool of metal. The primary reaction section 20 of the generator should usually be at least about three inches deep, and preferably about six to twelve inches in depth.

As a result of the improved generator design described above, the previous limitations on the maximum size of a single metal halide generator and on maximum production rate from a given size unit, particularly for aluminum chloride and bromide, have been eliminated. Moreover, the useful life of the generator of this invention is tremendously increased over that of the conventional metal halide generator. In addition to the outstanding superiority in durability and operating capacity, valuable advantages in safety and convenience of operation also accrue from the above design. Thus, the greatly improved system of introducing halogen gas to the reactor completely eliminates the possibility of halogen gas leaking into the water jacket compartment of the generator. And, since the halogen gas delivery tube is removable, the flow of gas can be interrupted temporarily without plugging up the entire halogen gas delivery system with frozen metal.

The basic advantages of the present apparatus are illustrated by the following example comparing its operation with that of a conventional generator under the very tough service conditions encountered in production of aluminum chloride.

*Example*

The test reactor was constructed in accordance with the design shown in the drawing except that the primary reaction section 20 was in the shape of a guadrangular prismoid. The inside dimensions of the reaction zone of the reactor were as follows:

Primary reaction section 20—3" deep and approximately 11" x 11" in average horizontal cross-section.

Lower body section—(above section 20 and below metal charging opening 14) approximately 12" x 20" in average horizontal cross-section.

Upper body section—(above metal charging port 14) approximately 12" x 12" in average horizontal cross-section.

Approximately 200 pounds of molten aluminum was charged to the reactor which was a sufficient amount to maintain a liquid seal of about 2" above the top of charging port 14. Then chlorine gas was introduced into the pool of molten aluminum through a dense graphite tube of about 1" I. D., discharging substantially at the bottom of the primary reaction section. Cooling water was circulated through the jacket surrounding the bottom of the reactor and through the coil surrounding the outer end of the graphite tube. The feed rate of the chlorine was gradually increased to approximately 100 lbs./hr. The reactor operated steadily at this rate without overheating and produced high grade $AlCl_3$ which, on recovery in a condenser, was collected continuously at a rate of about 125 lbs./hr. As the reaction proceeded additional aluminum was charged (in solid from) to maintain the level of molten aluminum an inch or two above the top of the charging port.

A conventional generator of substantially the same size but having a bottom feed chlorine delivery system entering the horizontal floor of the reaction zone of the generator through the water jacket was also charged with aluminum while simultaneously feeding chlorine gas and passing cooling water through the jacket. This generator operated satisfactorily at chlorine feed rates up to about 50 lbs./hr. However, attempts to increase the chlorine feed rate above 60 lbs./hr. immediately caused overheating, as evidenced by the production of a gray, discolored product and an increase in the temperature of the molten aluminum to a level above 1500° F. In contrast, the operation of the reactor of our invention described above at chlorine feed rates of 100 lbs./hr. resulted in bright colored (light yellow) product and steady maintenance of temperatures of 1300–1400° F. in the pool of molten aluminum. Even higher production rate can be achieved in the said reactor without exceeding the maximum permissible temperature of 1500° F. Moreover, the dimensions of the reactor described can easily be scaled up to permit several fold higher production rates without operating difficulties or size inconvenience.

Having thus described our invention and preferred embodiment thereof, what we claim as new and desire to secure by U. S. Letters Patent is:

1. A metal halide generator adapted for the reaction of halogen gas with molten metal comprising a generally upright chamber having a metal shell and a vapor outlet near the top, a jacket about the bottom section of said shell provided with inlet and outlet means for circulation of coolant liquid therethrough, a protective lining cemented in good thermal contact directly to the inner surface of said jacketed bottom section, a refractory heat insulating lining on the inside of the unjacketed portion of said shell, an impervious sleeve mounted in the sidewall of said shell immediately above said jacketed portion, an impervious conduit movably mounted in said sleeve with its lower end extending well down into the jacketed portion of the chamber, said bottom section lining, sleeve and conduit being composed of a material resistant to attack by both molten metal and halogen gas, means for feeding halogen gas to the upper end of said conduit, and a metal charging port in the sidewall of said shell above said jacketed portion.

2. The metal halide generator of claim 1 adapted for reaction of chlorine gas with molten aluminum at temperatures up to about 1500° F., in which the bottom lining, sleeve member and conduit are composed of graphite, the refractory heat insulating lining consists of a layer of high temperature metal oxide refractory and the exposed portion of the graphite conduit outside of said generator is protected from oxidation by means for a closely fitting cooling coil.

3. The metal halide generator of claim 2 in which the jacketed bottom section of said chamber is shaped so that the portion of the halogen gas conduit extending into said jacketed portion of said chamber is supported on the inside of the wall thereof.

4. The metal halide generator of claim 3 in which the jacketed section of said chamber has a V-shaped cross-section.

5. The metal halide generator of claim 3 in which the jacketed section of said chamber is in the form of an inverted cone.

6. The metal halide generator of claim 3 in which the jacketed section of said chamber is pyramidal in shape.

7. A metal halide generator adapted for the reaction of halogen gas with molten metal, comprising a generally upright chamber having a metal shell and a vapor outlet near the top, a jacket around the bottom section of said shell provided with inlet and outlet means for circulation of coolant liquid therethrough, a protective lining cemented in good thermal contact directly to the inner surface of said jacketed bottom section, a refractory heat insulating lining on the inside of the unjacketed portion of said shell, a movable impervious-walled conduit extending through the side wall of said chamber immediately above said jacketed portion and into the chamber entirely below normal fluid level therein, the discharge end of said conduit extending well down into the jacketed bottom section of the chamber, said bottom section lining and conduit being composed of a material resistant to attack by both molten metal and halogen gas, a metal charging port in the side wall of said shell above said bottom section, and means for supplying halogen gas to the inlet end of said conduit outside of the reaction chamber.

8. The generator of claim 7 in which said movable, impervious-walled conduit extends into the reaction chamber through the metal charging port.

References Cited in the file of this patent

UNITED STATES PATENTS

| | | |
|---|---|---|
| 558,725 | Gooch | Apr. 21, 1896 |
| 1,677,986 | Poindexter | July 24, 1928 |
| 2,510,932 | Poland | June 6, 1950 |